(12) United States Patent
Febrer et al.

(10) Patent No.: US 8,463,520 B2
(45) Date of Patent: Jun. 11, 2013

(54) METHOD FOR SECURING THE OPERATION OF AN AUTOMOBILE PROVIDED WITH HILL START ASSIST, AND SUCH AN AUTOMOBILE

(75) Inventors: Pascal Febrer, Paris (FR); Alessandro Monti, La Garenne Colombes (FR)

(73) Assignee: Renault S.A.S., Boulogne-Billancourt (FR)

( * ) Notice: Subject to any disclaimer, the term of this patent is extended or adjusted under 35 U.S.C. 154(b) by 50 days.

(21) Appl. No.: 13/062,622

(22) PCT Filed: Jul. 23, 2009

(86) PCT No.: PCT/FR2009/051484
§ 371 (c)(1),
(2), (4) Date: Jul. 27, 2011

(87) PCT Pub. No.: WO2010/026324
PCT Pub. Date: Mar. 11, 2010

(65) Prior Publication Data
US 2011/0276244 A1   Nov. 10, 2011

(30) Foreign Application Priority Data
Sep. 8, 2008 (FR) ...................................... 08 56005

(51) Int. Cl.
*G06F 7/70* (2006.01)

(52) U.S. Cl.
USPC .......................................................... 701/70

(58) Field of Classification Search
USPC .......................................................... 701/70
See application file for complete search history.

(56) References Cited

U.S. PATENT DOCUMENTS

| | | | |
|---|---|---|---|
| 6,135,920 A * | 10/2000 | Kamiya et al. | ................ 477/185 |
| 2003/0154952 A1 | 8/2003 | Osawa | |
| 2003/0221881 A1 | 12/2003 | Lee | |
| 2004/0043859 A1 | 3/2004 | Yurgil et al. | |
| 2006/0079377 A1 | 4/2006 | Steen et al. | |

FOREIGN PATENT DOCUMENTS

| | | |
|---|---|---|
| DE | 101 59 863 | 6/2002 |
| GB | 2 389 090 | 12/2003 |
| JP | 2008-128104 | * 6/2006 |
| WO | 2004 058551 | 7/2004 |

OTHER PUBLICATIONS

International Search Report Issued Dec. 15, 2009 in PCT/FRO9/051484 filed Jul. 23, 2009.

* cited by examiner

*Primary Examiner* — James Trammell
*Assistant Examiner* — Michale D Lang
(74) *Attorney, Agent, or Firm* — Oblon, Spivak, McClelland, Maier & Neustadt, L.L.P.

(57) ABSTRACT

Following an automobile start command, at least one condition is examined before a hill start assist is executed and if the condition is fulfilled, the execution of the hill start assist is prevented.

7 Claims, 2 Drawing Sheets

METHOD FOR SECURING THE OPERATION OF AN AUTOMOBILE PROVIDED WITH HILL START ASSIST, AND SUCH AN AUTOMOBILE

TECHNICAL FIELD

The present invention relates to a method for making safe the operation of a motor vehicle fitted with a hill-start assist, and such a motor vehicle.

When a motor vehicle is stopped on a hill, it is often difficult, or even sometimes dangerous, to make this vehicle start in the uphill direction. For many drivers, hill starts in the uphill direction are, because of this, a considerable source of stress.

During a hill start, the driver must as much as possible prevent his vehicle from moving backward, without stalling the engine for driving this vehicle and, to do so, he has to combine two actions which are the release of the brakes and the progressive coupling of the drive wheels of the vehicle to the engine for driving this vehicle.

This is why command and control devices usually called "hill-start assist devices" or "start-assist devices" have been studied in order to make the task of the driver easier during a hill start, by managing this start in his place.

PRIOR ART

In a hill-start assist device, a computer controls the release of the brakes of the vehicle on the basis of various items of information such as measurements originating from several sensors. To do this, it uses a specific strategy, such as that described in French patent application FR-2 828 450 or that described in French patent application FR-2 841 199.

Among the currently available strategies for executing a hill-start assist, not all are equally effective. Moreover, some of them are more appropriate than others depending on the type of vehicle concerned and on its particular features. In addition, certain flaws in the hill-start assist devices currently proposed may not yet have been revealed.

The present invention therefore forms part of a general approach to finding possible improvements in hill-start assist devices, notably on the subject of safety of operation.

SUMMARY OF THE INVENTION

One subject of the invention is a method for making safe the operation of a motor vehicle fitted with a drive train for driving it and a device for applying a hill-start assist. In this method, following a command to start the vehicle or to set the vehicle in motion, at least one condition is examined before a hill-start assist is executed and the execution of this hill-start assist is prevented if said condition is fulfilled.

By virtue of the method defined above, the hill-start assist is prevented when in a situation in which it could have harmful consequences. It has been found that such a situation occurred when the drive train for driving the vehicle is in the stopping phase without yet being fully stopped. This situation may be encountered in new-generation motor vehicles in which the engine does not stop immediately in response to a stop command, but only after several tests initiated by this stop command have been run to their completion.

If a stop command has been accidentally initiated without the driver of the motor vehicle realizing it, this driver may wish to carry out a start during the stopping phase of the drive train of the vehicle. By virtue of the invention, the execution of the hill-start assist can be prevented in such a situation in order to avoid a possible malfunction of the assembly and/or an accident, for example possibly resulting from an inopportune release of the parking brakes of the vehicle.

Another situation in which an execution of the hill-start assist may lead to a malfunction is that of a failure of at least one device supplying an item of data used by the hill-start assist. By virtue of the invention, such a malfunction can also be avoided.

The invention may also be used to prevent the setting in motion of a hill-start assist while a door of the motor vehicle is still open or else while this vehicle is in another configuration that is normal when stationary but dangerous or otherwise unacceptable at full speed.

Therefore, said condition is advantageously chosen from the fact that stopping the drive train is in progress, the fact that an item of information used to apply the hill-start assist is considered to be invalid, the fact that an anomaly is detected in the device for applying the hill-start assist and the fact that it is detected that the vehicle is in a configuration that is possible during an immobilization of the vehicle but forbidden when the vehicle is in motion.

Advantageously, the condition is that stopping of the drive train is in progress. In this situation, the condition is advantageously considered to be fulfilled from the time of a command to stop the drive train and only for as long as at least one of three situations has not occurred, which situations are:

that the drive train is stopped while no command to stop the drive train has been given;

that, since the last command to stop the drive train, a predetermined time has not fully elapsed, while no command to stop the drive train has been given; and that the speed of the motor vehicle is higher than a predetermined speed, while no command to stop the drive train has been given.

Advantageously, said condition and at least one other condition, that is to say a number of different conditions, are examined and an execution of the hill-start assist is prevented if at least one of these different conditions is fulfilled.

Advantageously, an execution of the hill-start assist is stopped from being prevented if said condition is no longer fulfilled.

Another subject of the invention is a motor vehicle, comprising a drive train for driving it and a device for applying a hill-start assist, this device for applying a hill-start assist being designed to examine at least one condition following a command to start the vehicle and not to execute the hill-start assist if this condition is not fulfilled.

For the same reasons as those set out above, this motor vehicle has an operation the safety of which is improved.

Advantageously, the device for applying a hill-start assist of the motor vehicle is designed to apply a method as defined above.

BRIEF DESCRIPTION OF THE FIGURES

The invention will be clearly understood on reading the following description given as a nonlimiting example and made with reference to the appended drawings, among which.

POSSIBLE MANNER OF EMBODYING THE INVENTION

Figure 1:
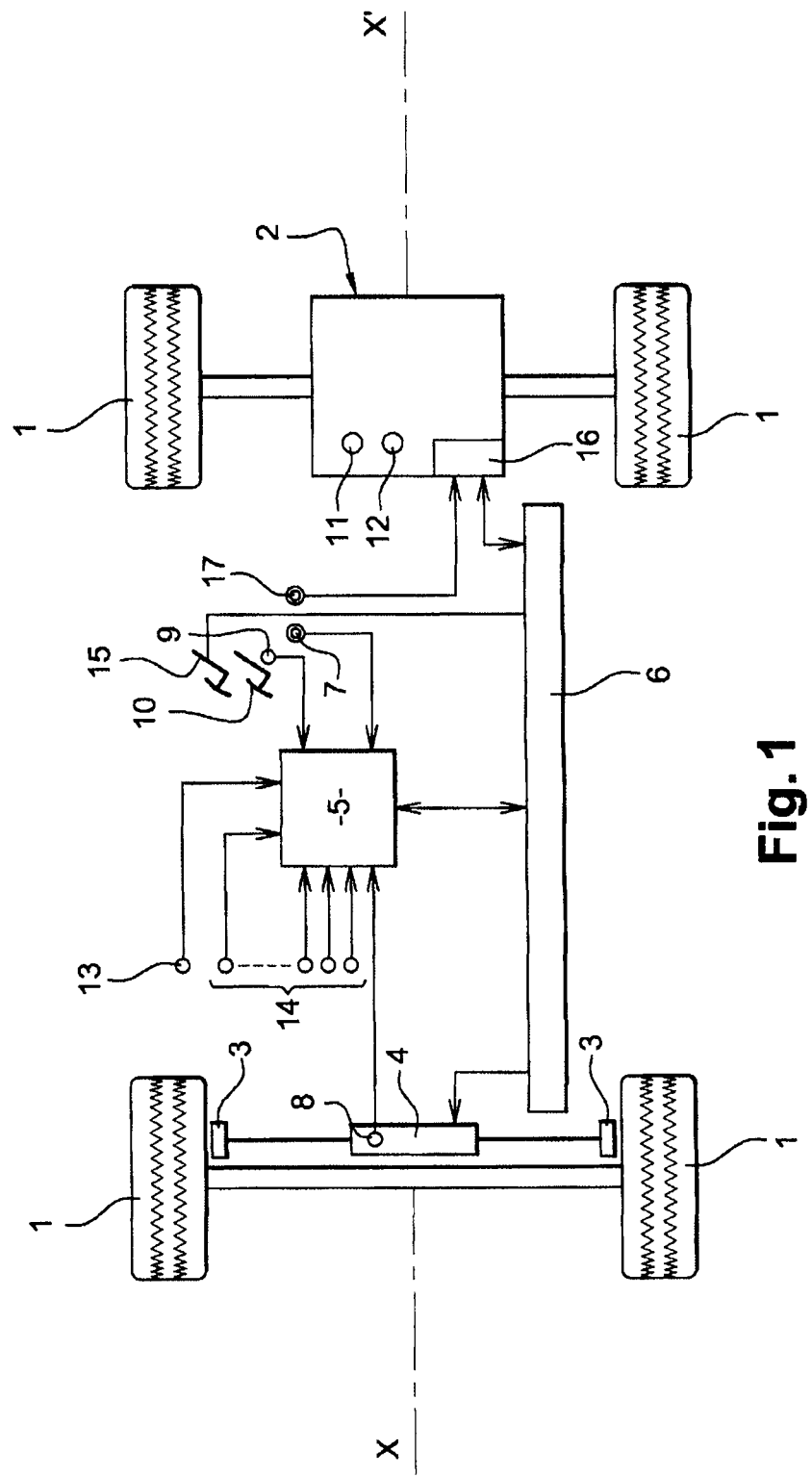
FIG. 1 is a simplified diagram of a motor vehicle that is fitted with a hill-start assist and that complies with the invention.

In FIG. 1, a motor vehicle is symbolized by its four wheels 1 and by its drive train 2 which is coupled to several wheels 1 and which conventionally comprises an engine, such as an internal combustion or electric or else hybrid engine, a gearbox and a clutch or an equivalent device.

In the following and in the appended claims, the terms "front", "rear", "anteroposterior", and similar terms refer to the normal direction of travel of the motor vehicle.

The motor vehicle shown in FIG. 1 comprises electrically-controlled parking brakes 3, each of which is associated with a wheel 1, and an electrical actuator 4 that is capable of maneuvering between an on position for immobilizing the vehicle when stationary and an off or neutral position.

A computer 5 controls the electrical actuator 4 to which it is connected via a bus 6 such as a bus of the CAN (trade mark) type, the function of which is to transmit data. This bus 6 also connects the computer 5 and the drive train 2 to each other.

The computer 5 is designed to automatically manage the parking braking of the motor vehicle by commanding the brakes 3 to go on as soon as the vehicle is stationary and until the driver commands a start of this vehicle. In other words, the motor vehicle is provided with the function usually called "automatic parking brake". The driver can also himself command the parking brakes 3 to go on or off by pressing a button 7 connected to the computer 5.

The computer 5 is also capable of applying a hill-start assist function fitted to the motor vehicle. Accordingly, this computer 5 is connected to several sensors including a sensor 8 for measuring or estimating the clamping pressure of the parking brakes 3, a sensor 9 for detecting the position of a clutch pedal 10, a sensor 11 for detecting the gear ratio in the gearbox of the drive train 2, a sensor 12 for detecting the rotation speed of the engine of the drive train 2 and a sensor 13 for measuring the inclination of the anteroposterior axis X-X' of the vehicle relative to the horizontal. The reference 14 designates several other sensors that are capable of providing measurements or other items of information to the computer 5 included among which are a sensor of the speed of the motor vehicle, a sensor of the torque supplied by the engine of this vehicle and sensors of the respective rotation speeds of the wheels coupled to the drive train 2. Items of information relating to the position of the gas pedal 15 of the vehicle also reach the computer 5, via the bus 6, to which this gas pedal 15 is connected.

The drive train 2 comprises a computer 16 for controlling the operation of its engine. A button 17 for controlling the stopping or starting of this engine is connected to the computer 16.

The computer 5 is capable of managing a start of the vehicle instead of the driver, in a manner known per se, for example in the manner proposed in French patent application FR-2 828 450. When it receives or deduces a command from the driver to carry out such a start, this computer 5 begins by checking whether a plurality of conditions are all fulfilled together, as illustrated in FIG. 2.

Figure 2:
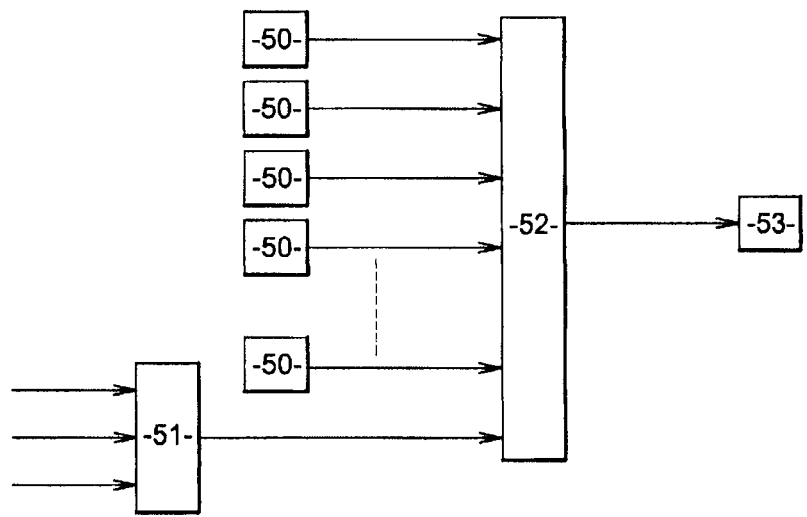
FIG. 2 is a block diagram of the operating logic of a method according to the invention and provided to make safe the operation of the motor vehicle of FIG. 1.

In this FIG. 2, the references 50 and 51 designate tests concerning the conditions that must be fulfilled together. One of the tests 50 checks for example whether the item of information received by the computer 5 relating to the rotation speed of the engine is or is not valid. Another test 50 may check whether the information received by the computer 5 relating to the position of the gas pedal 15 is or is not valid.

More precisely, the content of the tests 50 and 51 is chosen according to the strategy or logic according to which the computer 5 proceeds in order to control the hill-start assist. The state of the engine, either running or stopped or driven by the starter, the validity or invalidity of the item of information relating to the speed of the vehicle, the validity or invalidity of the item of information relating to the inclination of the vehicle, the validity or invalidity of the item of information relating to the position of the clutch pedal, the validity or invalidity of the item of information relating to the torque supplied by the engine, the validity or invalidity of the item of information relating to the rotation speeds of the wheels 1 coupled to the drive train 2 and the validity or invalidity of the item of information relating to the gear ratio selected in the gearbox are other examples of the results that the tests 50 can produce.

The validity of an item of information received by the computer 5 can be tested in different ways known per se. For example, an item of information may be considered invalid if it is a value outside the normal range of variation of this value, if it is not consistent with another item of information received by the computer 5 and/or if it is not received during several successive frames of transmission of information by the bus 6.

In one test 50, it is also possible to check whether the parameters according to which the hill-start assist algorithm is configured are correct or corrupted.

In one test 50, it is also possible to check whether or not a condition exists that it is normal to encounter when the vehicle is stopped, but which opposes the starting of the vehicle and which, for example, can be that a door of the vehicle is not closed or not correctly closed.

The test 51 relates to the possible initiating of a process of stopping the engine forming part of the drive train 2.

By pressing the button 17 the driver can actually send a command to stop the engine to the computer 16 and thus initiate such a process. On receipt of this command, the computer 16 does not immediately cause the engine to actually stop. Beforehand, it runs several tests so that the engine of the vehicle remains in operation for a certain period between an action on the button 17 and the stopping of the engine. During this period, the computer 5 must not start the vehicle nor release the parking brakes 3. In point of fact, as long as the engine is not fully stopped, the driver may have forgotten that he has commanded the engine to stop and may wish to start the vehicle. The same type of situation may occur also when the action on the button 17 is accidental so that, not knowing that an engine-stopping process has been initiated, the driver may wish to start the vehicle during this engine-stopping process.

Figure 3:
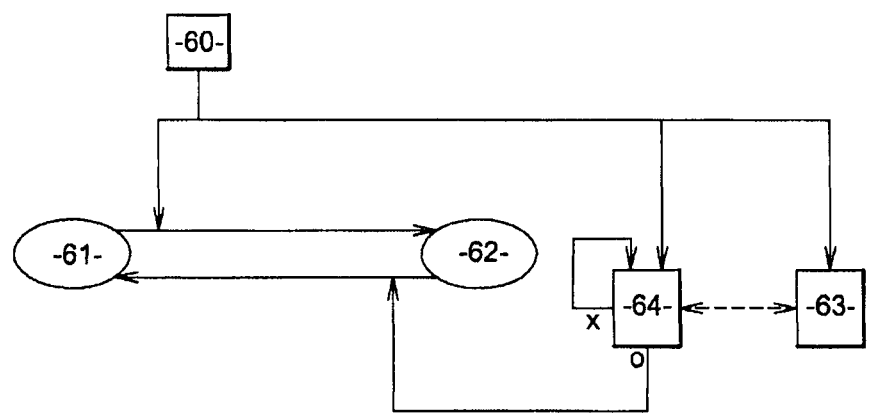
FIG. 3 is a block diagram of the operating logic of an evaluation of whether stopping of the drive train for driving the motor vehicle shown in FIG. 1 is or is not in progress.

In order to prevent the computer 5 starting the vehicle when its engine is in the process of being stopped, this computer 5 checks in the test 51 whether or not it must be considered that stopping of the engine is in progress. FIG. 3 illustrates how it is determined whether or not stopping of the engine is in progress.

In this FIG. 3, the reference 60 designates an action on the button 17, that is to say a manual command to stop the engine. This manual command 60 causes a transition from the state 61, in which it is considered that no stopping of the engine is in progress, to the state 62 in which it is considered that the engine is in the process of being stopped. The manual stop command 60 initiates a step 63 in which a timer is initialized and counts down. The manual stop command 60 also causes the starting of a triple test 64 in which three conditions are examined. The triple test 64 is reiterated regularly until at least one of these three conditions is fulfilled, in which case there is a return to the state 61, considering that stopping of the engine is no longer in progress.

The first fact that can cause the return to the state 61 is that the speed of the motor vehicle is higher than a predetermined speed while no manual stop command 60 has been given. The second fact that can cause a return to the state 61 is that the time or predetermined period counted down in the step 63 has fully elapsed while no manual stop command 60 has been given. The third fact that can cause a return to the state 61 is a complete stop of the engine while no manual stop command 60 of the engine has been given. In other words, the test 64 causes a transition from the state 62 to the state 61 if there is no request to stop the engine and if, in parallel, the speed of the motor vehicle is higher than a predetermined speed and/or the count-down made in the step 63 is not complete and/or the engine is completely stopped. Naturally, any new manual stop command 60 reinitializes the count-down that takes place in the step 63.

The computer 5 registers an item of information indicating which of the two states 61 and 62 the vehicle is in. In the test 51, it asks for this information.

As can be seen in FIG. 2, the computer 5 makes a summary 52 of the results of the tests 50 and 51. If at least one of these results indicates that the vehicle must not be started, the computer 5 takes no action on the command to start the vehicle. If none of the results of the steps 50 and 51 opposes starting the motor vehicle, the computer 5 applies the hill-start assist 53 in a manner known per se, for example according to the disclosure of French patent application FR-2 828 450 or according to the disclosure of French patent application FR-2 841 199 or else in any other appropriate manner.

The outcome of the foregoing is that the hill-start assist 53 is not applied in certain cases in which it could lead to a malfunction or even to an accident.

The invention claimed is:

1. A method for making safe an operation of a motor vehicle that includes a drive train for driving the vehicle and a device for applying a hill-start assist, the method comprising:
    examining, in response to a command to start the vehicle, at least one condition before executing the hill-start assist; and
    preventing execution of the hill-start assist when the at least one condition is satisfied,
    wherein a first condition of the at least one condition is that stopping of the drive train is in progress.

2. The method as claimed in claim 1, wherein the first condition is satisfied from a time of a command to stop the drive train and only for as long as at least one of three situations (1)-(3) has not occurred, the three situations being:
    (1) the drive train is stopped while no command to stop the drive train has been given;
    (2) since the last command to stop the drive train, a predetermined time has fully elapsed, while no command to stop the drive train has been given; and
    (3) the speed of the motor vehicle is higher than a predetermined speed, while no command to stop the drive train has been given.

3. The method as claimed in claim 1, further comprising:
    examining the first condition and at least one other condition, and
    preventing an execution of the hill-start assist when at least one of the at least one other condition is satisfied.

4. The method as claimed in claim 3, wherein the at least one other condition includes determining the validity of vehicle information relating to rotation speed of an engine of the vehicle, position of a gas pedal of the vehicle, speed of the vehicle, inclination of the vehicle, position of a clutch pedal of the vehicle, torque supplied by the engine, rotation speed of wheels of the vehicle, or gear ratios.

5. The method as claimed in claim 4, wherein the at least one other condition is satisfied when any of the vehicle information is determined to be invalid.

6. The method as claimed in claim 1, further comprising:
    stopping an execution of the hill-start assist from being prevented when the first condition is no longer satisfied.

7. A motor vehicle, comprising:
    a drive train for driving the vehicle; and
    a device for applying a hill-start assist that includes a processor programmed to
        examine, in response to a command to start the vehicle, at least one condition before executing the hill-start assist; and
        prevent execution of the hill-start assist when the at least one condition is satisfied,
    wherein a first condition of the at least one condition is that stopping of the drive train is in progress.

* * * * *